Inventor
ERNEST W. HOLMES

Dec. 2, 1941.  E. W. HOLMES  2,264,569
WRECKING TRUCK
Filed April 5, 1939  4 Sheets-Sheet 3
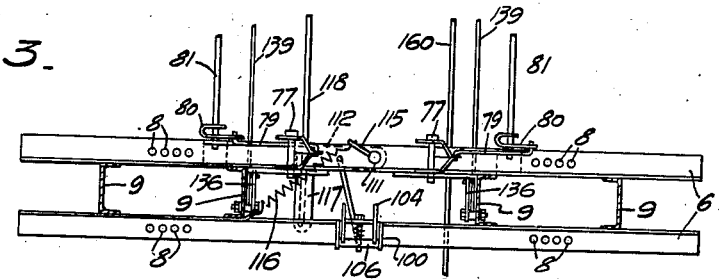
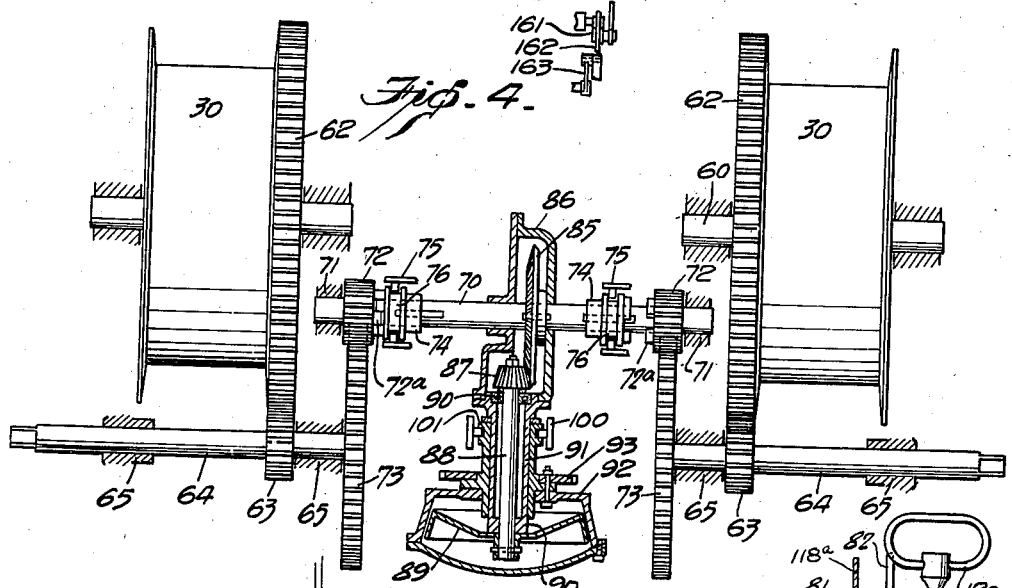
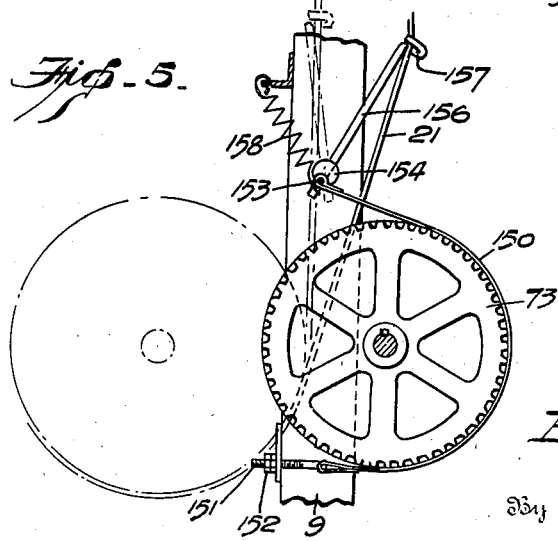
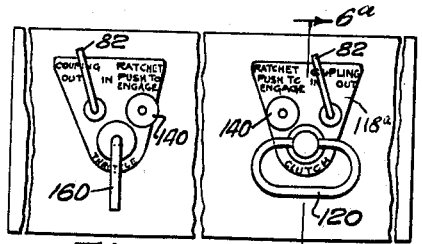
Inventor
ERNEST W. HOLMES
By
Attorneys Dec. 2, 1941.  E. W. HOLMES  2,264,569
WRECKING TRUCK
Filed April 5, 1939  4 Sheets-Sheet 4
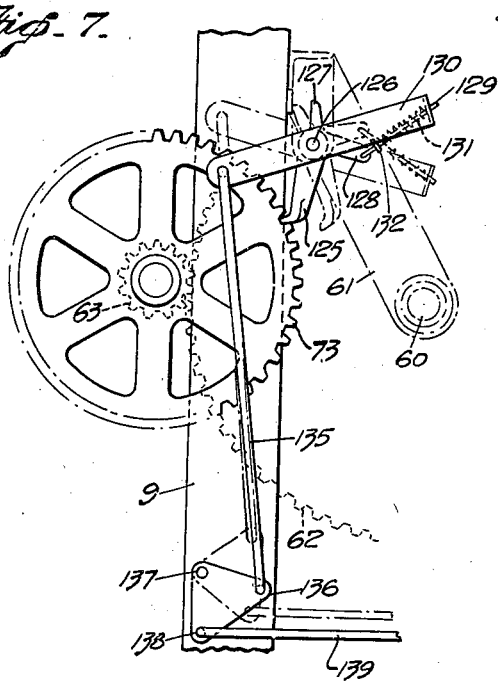
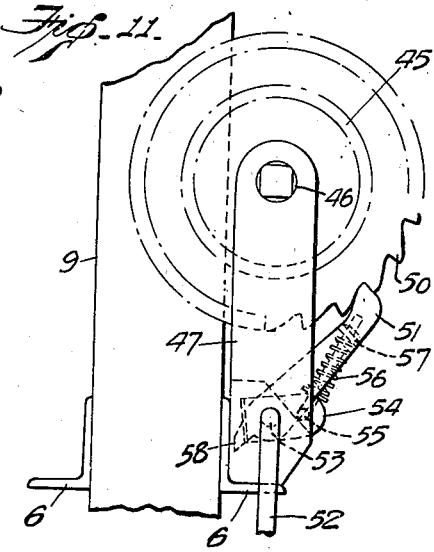
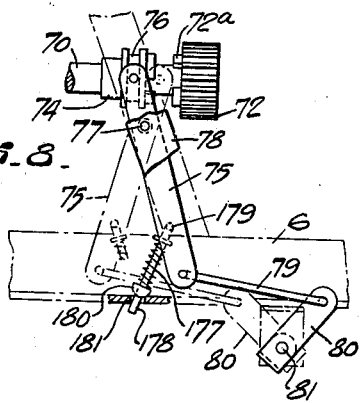
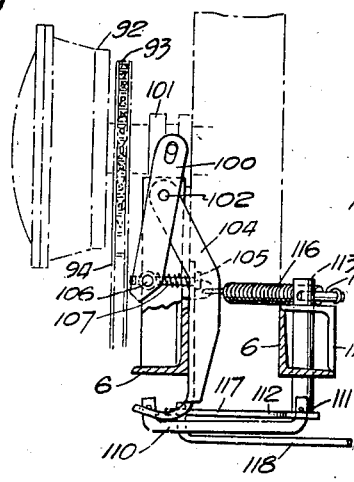
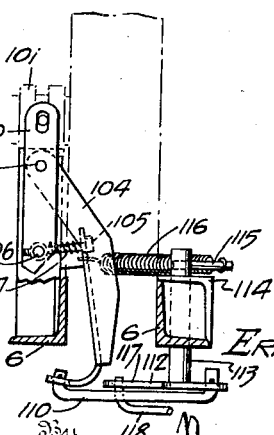
Inventor
ERNEST W. HOLMES
Attorneys Patented Dec. 2, 1941

2,264,569

UNITED STATES PATENT OFFICE 2,264,569

WRECKING TRUCK

Ernest W. Holmes, Chattanooga, Tenn., assignor to Ernest Holmes Company, Chattanooga, Tenn., a corporation of Tennessee Application April 5, 1939, Serial No. 266,217

10 Claims. (Cl. 212—59)

The present invention relates to improvements in automobile service and wrecking trucks, and more particularly to those of the type shown and described in my U. S. Patent Reissue No. 14,720 granted September 2, 1919, in which derrick or hoisting mechanism is mounted on a truck or similar automotive vehicle and is adapted to hoist disabled automobiles or other vehicles for towing or other purposes.

Heretofore, the hoisting mechanism of wrecking trucks of the power operated type driven from the truck engine have been objectionable since they have required the services of at least two attendants, one stationed at the rear of the truck to observe the progress of the lifting operation and the other to control the power applied to the hoisting mechanism by the engine and to release the hoisting drum or drums while the lowering operation takes place, due to the location of the control means remote from the rear of the truck where the lifting and lowering operations usually take place, and the location and arrangement of such control means, usually at the side or within the truck, has heretofore been such as to otherwise render the manipulation thereof inconvenient.

The primary object of the present invention is to provide novel and improved means whereby the operation of the hoisting mechanism may be controlled with greater facility than heretofore and by a single attendant who may be stationed in a position at the rear of the truck where he can advantageously observe and control the operations of the hoisting cables.

More particularly, the invention provides means for controlling from the rear of the truck the power operation of one or both of a pair of drums which wind a pair of hoisting cables during the lifting operation and the releasing of the drums to permit lowering of the disabled automobile or other load.

The invention also provides means for controlling from the rear of the truck the main clutch through which power is transmitted to the hoisting drums to operate them.

The invention further provides means operable from the rear of the truck for controlling the engine of the truck which supplies the power for the operation of the drums whereby the power may be applied and controlled as required to effect the lifting operation.

To these and other ends, the invention consists in certain improvements and combinations and arrangements of parts all as will be hereinafter more fully described, the features of novelty being pointed out particularly in the claims at the end of this specification.

In the accompanying drawings:

Figure 3 is a detail horizontal section taken on the line 3—3 in Fig. 2;

Figure 4 is a horizontal section taken on the line 4—4 in Fig. 2;

Figure 5 is a detail vertical section taken on the line 5—5 in Fig. 2;

Figure 6 is an elevation of the rear end of the truck chassis, partly broken away, showing the controlling means for the derrick or hoisting mechanism;

Figure 6a is a detail section taken on the line 6a—6a in Fig. 6;

Figure 7 is a detail vertical section taken on the line 7—7 in Fig. 2;

Figure 8 is a detail view of one of the clutches controlling the operation of one of the hoisting drums;

Figure 9 is a detail view of the controlling means for the clutch through which power is transmitted from the truck engine to the hoisting drums, the clutch being in disengaged condition in this figure;

Figure 10 is a view similar to Fig. 9 but showing the clutch controlling means in position to engage the power transmitting clutch; and Figure 11 is a detail side elevation showing one of the winches for adjusting the elevation of the respective boom.

Similar parts are designated by the same reference characters in the different figures.

Figure 1:
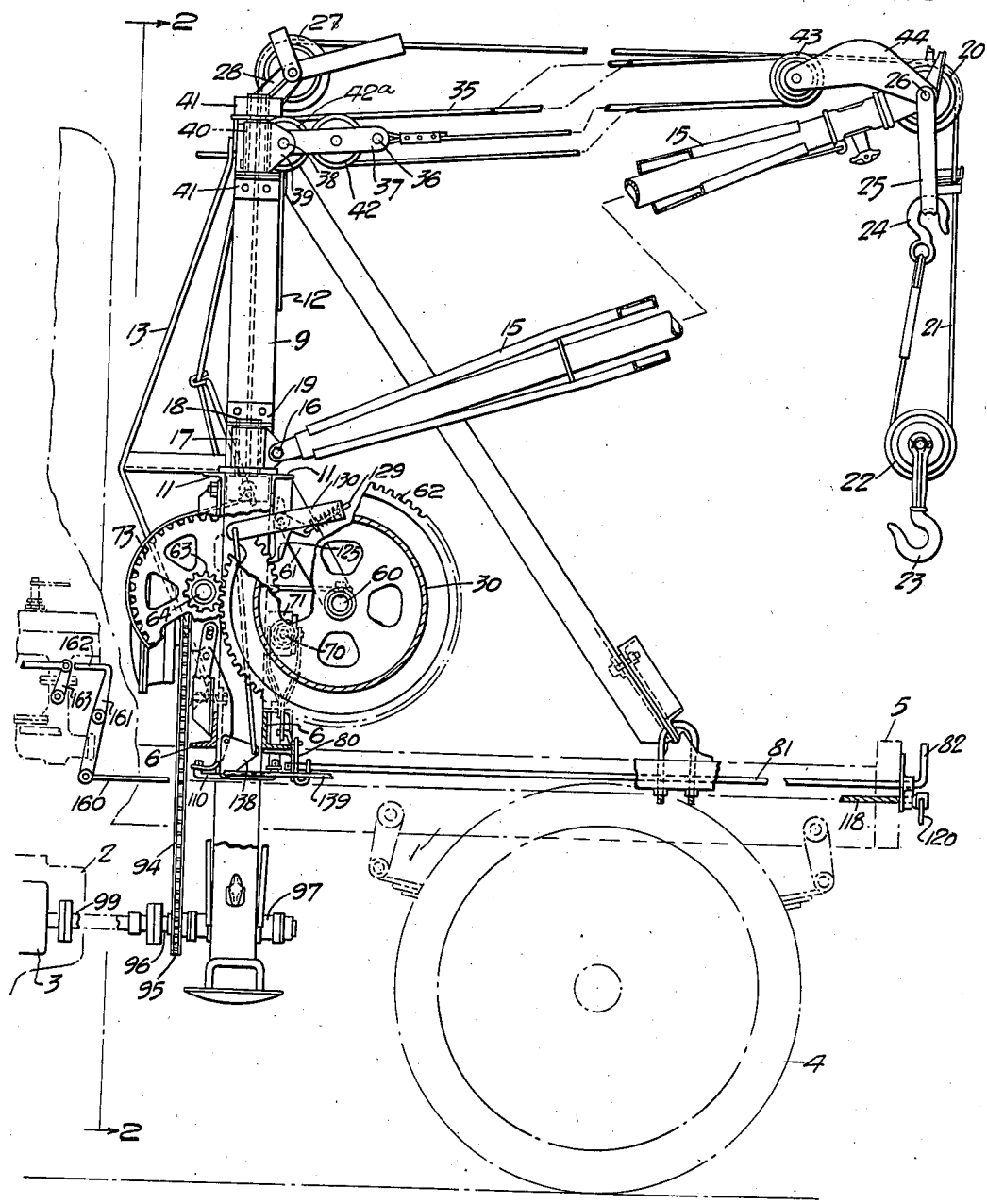
Figure 1 is a side elevation of the rear portion of a wrecking truck having derrick or hoisting mechanism mounted thereon and provided with controlling means according to the present invention.
Figure 2:
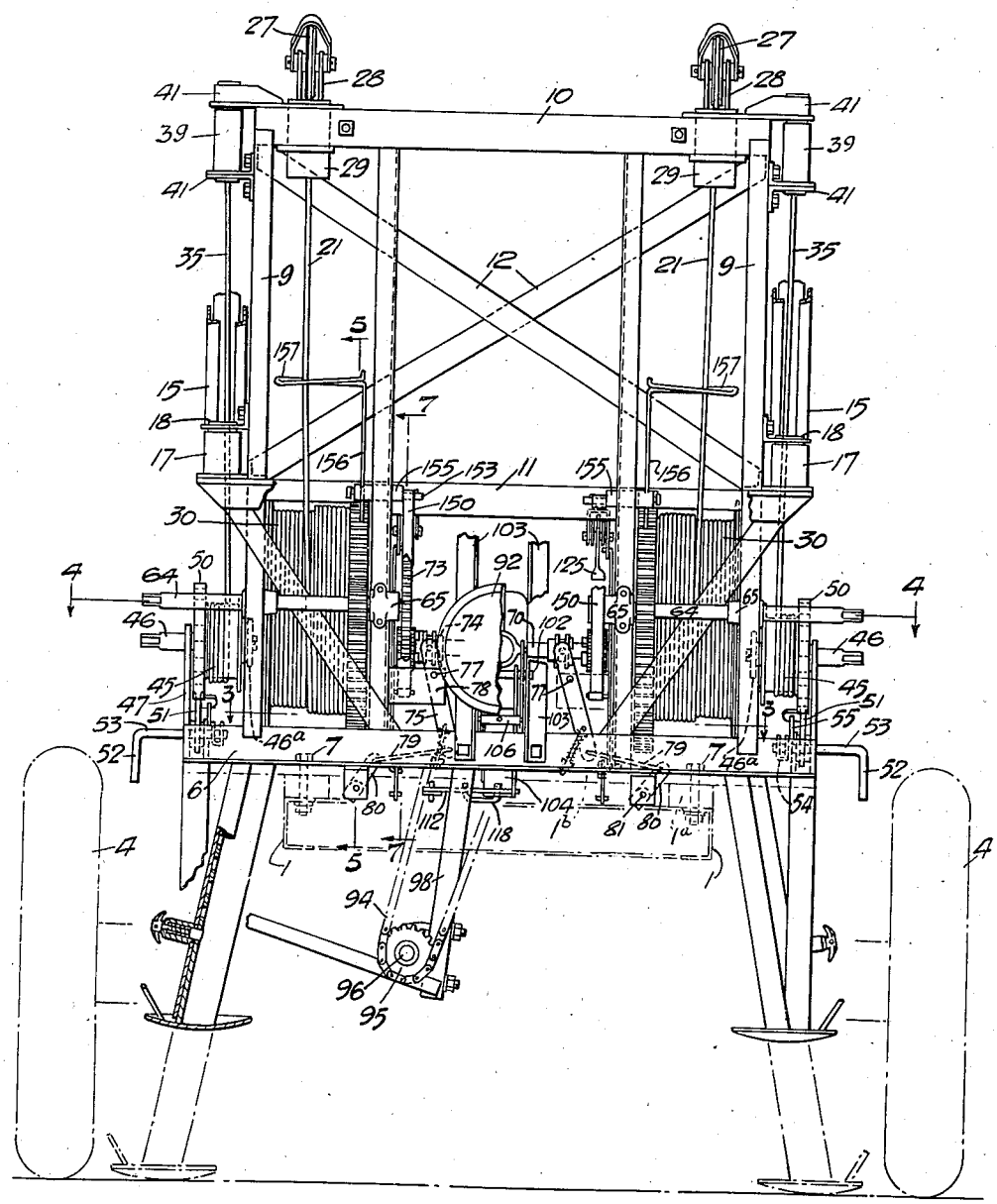
Figure 2 is a transverse vertical section taken on the line 2—2 in Fig. 1.

The invention is shown in the present instance as applied to a derrick or hoisting mechanism mounted on an automotive truck for use as a portable derrick or hoisting mechanism adapted for hoisting purposes generally but especially adapted for extricating damaged or wrecked automobiles from the positions in which they may be left as the result of an accident or for lifting such vehicles for towing. The preferred embodiment of the invention is shown in the present instance as applied to derrick or hoisting mechanism of the double boom type, but certain features of the invention are applicable to derrick or hoisting mechanism having a single boom.

In the present instance 1 designates generally the chassis of an automotive truck of conventional form having longitudinal sills 1ª resting thereon and supporting the truck floor 1ᵇ. The truck has an engine as usual for propelling it, and the transmission 2 of the truck is provided with a power take-off 3 which may be of any usual or well known form for furnishing power for the operation of the derrick or hoisting mechanism. 4 represents the rear wheels of the truck and 5 represents the board or similar member which extends across the rear end of the truck chassis and is secured thereto.

The derrick or hoisting mechanism as shown in the present instance comprises a frame composed of a pair of angle iron members 6 which extend transversely across and rest on the truck floor and are fixed to the truck by bolts 7 extending through holes 8 in the angle iron members and in the longitudinal members of the truck chassis, uprights 9 preferably in the form of channel irons interposed between and welded or otherwise secured at their lower ends to the horizontal angle irons 6, and an upper cross member 10 to which the upper ends of the uprights are suitably secured as by welding. Intermediate members 11, preferably in the form of angle irons, extend horizontally across and are welded or otherwise secured to the uprights 9. Diagonal braces 12 are preferably provided to increase the rigidity of the frame, they extending from the upper corners thereof to the outer ends of the rear cross member 11, and the outer upright members 9 are preferably stiffened by trusses 13 to sustain the thrust exerted on these upright members by the lower ends of the booms.

A pair of booms 15 are employed in the derrick or hoisting mechanism shown, one end of each boom being pivoted at 16 to a swivel sleeve 17, the sleeve being fitted rotatably on a tubular member 18 which is secured at its lower end in the respective end of the cross member 11 and is secured at its upper end in a bracket 19 which is bolted or otherwise fixed to the outer side of the respective upright member 9. Such mounting of the lower end of each boom allows the respective boom to be lifted and lowered about the pivot 16 as a center and also to swing horizontally about the sleeve 18 as a center.

Each of the booms is provided at its free or outer end with a sheave 20 over which a hoisting cable 21 passes, this hoisting cable also passing preferably around a sheave 22 the shaft of which carries a lifting hook 23, the extremity of the hoisting cable being provided with a hook 24 which may be either employed for lifting or, as shown, may be engaged in a yoke 25 which is pivoted on the shaft 26 of the sheave 20. Each hoisting cable 21 passes from the sheave 20 to a sheave 27 which is mounted in a bracket 28 having a tubular sleeve 29 thereon which is mounted rotatably in the top member of the frame so that this sheave may swivel about this sleeve as a vertical axis to accommodate itself to the horizontal swinging movements of the respective boom. Each hoisting cable 21 extends down to and is connected to a hoisting drum 30 on which it is adapted to be wound. These hoisting drums are provided with power means for operating one or the other thereof independently or for operating them both simultaneously, as will be hereinafter described.

The outer or free end of each boom is supported and raised and lowered by a cable 35 one end of which is attached at 36 to a link 37 which is pivoted at 38 to a swivel bracket 39, this bracket being mounted rotatably on a sleeve 40 the axis of which is vertical and the upper and lower ends of which are fixed in brackets 41 secured to the outer side of the respective upright member 9. The intermediate portion of this boom adjusting cable 35 passes around a sheave 42 carried by the link 37 and around a sheave 43 which is carried by a link 44 the outer end of which is pivoted on the shaft 26 which is secured in the outer end of the boom. The other end of each boom adjusting cable passes around a sheave 42ª and through the sleeves 18 and 29 and is attached to a winch 45 which is fixed to a shaft 46, said shaft being journalled in a bracket 46ª secured to the respective outer upright member 9 and in a bracket 47 secured to the outer end of one of the angle irons 6. The outer end of the shaft 45 is squared or otherwise formed to receive a crank for operating it to rotate the winch and thereby wind the boom adjusting cable thereon. A ratchet wheel 50 is fixed to the winch and a pawl 51 is provided to cooperate with the ratchet wheel and thereby hold the winch in adjusted position and prevent unwinding of the boom adjusting cable therefrom. The pawl 51 is controlled by a handle 52 which projects from the respective side of the frame, this handle comprising a shaft 53 which is mounted rotatably in the bracket 47 and serves as a pivot for the pawl 51 which is mounted rotatably thereon. A yoke shaped crank 54 is fixed to the shaft 53 and has one end of a rod 55 mounted pivotally therein, this rod having a compression spring 56 mounted thereon and arranged to bear against a lug 57 which projects from one side of the pawl 51. By this arrangement, when the handle 52 is rotated into the position shown in Fig. 11, in which position the lower bent end of the rod 55 may rest against an adjacent edge of the bracket 47, the spring 56 will act on the pawl 51 to retain it in locking engagement with the ratchet wheel 45, thereby holding the boom at the desired adjusted elevation, and when the handle 52 is swung to the right in Fig. 11, the point of pivotal engagement of the rod 55 with the crank 54 will be carried over a dead center position between the shaft 53 and the lower end of the rod 55 will rest against the adjacent edge of the bracket 47, and the lug 57 and the spring 56 will then act to disengage the pawl from the ratchet wheel, the disengaging movement of the pawl being limited by a tail 58 on the pawl which is engageable with the adjacent angle iron 6, and taking place when the load on the pawl 51 is relieved by a slight winding movement of the drum 46.

Each of the drums 30 is mounted on a shaft 60 which is supported by brackets 61 which are bolted or otherwise fixed to adjacent pairs of the upright members 9, and each drum has a gear 62 fixed thereto with which a pinion 63 meshes, the pinions 63 being fixed on shafts 64 which are journalled in suitable bearings 65 on the respective pairs of upright members 9 and the outer ends of these shafts are squared or otherwise adapted to receive a crank for rotating them whereby the respective drums may be rotated manually when desired.

The power means for operating the hoisting drums 30 comprises a shaft 70 which is journalled in bearings 71 mounted on the inner upright members 9, this shaft having a pair of pinions 72 fixed thereon and meshing with larger gears 73 fixed to the shafts 64. Each of the pinions 72 is provided at its inner side with clutch jaws 72ª, and a pair of sliding jaw clutch members 74 are splined on the shaft 70 so that they may move into and out of clutching engagement with the respective pinions. Each of these jaw clutch members is shifted into engaged or disengaged position by a yoke 75 the upper end of which is provided with pins to engage a collar 76 on the respective sliding clutch member, each of the yokes being pivoted at 77 on a bracket 78 secured to the frame and having its lower end pivotally connected to one end of a rod 79 the other end of which is pivotally connected to a crank 80 fixed to a rod 81, this rod extending through the cross member 5 at the rear end of the truck and having a handle 82 formed thereon for rotating it to engage or disengage the respective sliding clutch member 74 with respect to the corresponding pinion 72. A compression spring 177 carried by a rod 178 which is pivotally connected at 179 to the yoke 75 and slidable through a collar 180 thereon and an aperture 181 in the adjacent angle iron member 6 acts to yieldingly retain the respective clutch member in engaged or disengaged relation with the corresponding pinion, this spring passing over a dead center position when the yoke is swung into the clutch engaged or disengaged position as indicated by the full and dotted lines in Fig. 8.

Power is applied to the shaft 70 through a bevel gear 85 which is fixed thereon and enclosed in a casing 86, the gear 85 meshing with a bevel pinion 87 which is fixed to a shaft 88, the latter having a friction clutch member 89 preferably of the cone type as shown fixed thereon. The shaft 88 is journalled in bearings 90 in an extension 91 of the casing 86, and this extension 91 has a friction clutch member 92 mounted rotatably and slidably thereon. The clutch member 92 as shown is in the form of a casing which encloses the clutch member 89 and has a conical portion to cooperate therewith. The casing 92 has a sprocket wheel 93 fixed thereto, this sprocket wheel cooperating with a chain 94 which engages a sprocket wheel 95 on a shaft 96, the latter shaft being journalled in a suitable bearing 97 supported by a bracket 98 secured to the frame, and being coupled to the shaft 99 of the power take-off device 3.

The clutch member 92 is shifted into and out of driving relation with the clutch member 89 by a shifting yoke 100 the upper end of which is provided with pins which cooperate with a collar 101 on the casing 92, this yoke being pivoted at 102 to a pair of supporting brackets 103 which are bolted or otherwise secured to the frame. A lever 104 is also pivoted to the pivot pin 102 and it carries a screw 105 which is threaded in a cross pin 106 which connects the lower ends of the yoke 100, a compression spring 107 encircling the screw and bearing at its ends against the lever 104 and the pin 106. This screw and spring provide for an adjustment in the angular relationship of the lever 104 and the yoke 100, to enable these parts to be adjusted to effect the engaging and disengaging operations of the clutch members 89 and 92. The lower portion of the lever 104 operates between the angle irons 6, as shown in Fig. 9, and in the normal disengaged relation of the clutch members 89 and 92 it lies against one of these angle irons as shown in Fig. 9. The lower end of the lever 104 is pivotally and loosely connected to one end of a link 110, the other end of this link being pivotally and loosely connected to an arm 111 of an L-shaped lever 112, the latter being fixed to a pivot pin 113 which is mounted rotatably in one of the angle iron members 6 and a cooperating angle arm member 114, the upper end of this pivot pin having an arm 115 which projects radially therefrom, this arm being attached to one end of a tension spring 116, the other end of this spring being attached to the adjacent portion of the frame. Another arm 117 on the L-shaped lever 112 has a steel or other flexible cable 118 connected thereto, this cable extending through the cross member 5 at the rear end of the truck and being provided at its rear extremity with a clevis or other suitable form of handle 120. The arrangement of the tension spring 116 in relation to the L-shaped lever 112 is such that it will tend to hold the lever 104 against the adjacent angle iron member 6 as shown in Fig. 9, thereby holding the clutch member 92 in disengaged relation with the clutch member 89, this spring however permitting the lever 104 to swing into the position shown in Fig. 10 when the cable 118 is pulled, to effect engagement of the clutch member 92 with the clutch member 89. The cable 118 preferably extends through a plate 118ª which is provided with a flared opening 118ᵇ which allows the cable to be pulled in any desired angle, as indicated in Fig. 6ª.

Means controllable from the rear end of the truck is provided for releasably holding the lifting cable winding drums under the weight of the loads thereon, such means as shown in the present instance comprising a ratchet pawl 125 to cooperate with each of the gears 73, this ratchet pawl being pivotally mounted on a pivot pin 126 supported on the respective bracket 61, one arm of the pawl being engageable with the teeth of the respective gear wheel 73 and having a tail 127 engageable with a portion of the adjacent bracket 61 to limit its swing into disengaged position, and the pawl 125 also has an arm 128 thereon which is pivotally connected to one end of a rod 129, the other end of this rod extending slidably through the end of a lever 130 and having a compression spring 131 mounted thereon one end of which bears against the end of the lever 130 and the other end of which bears against a collar 132 on the rod. The lever 130 is pivoted to rock on the pin 126 into either the full line position shown in Fig. 7 in which position the spring 131 will act on the pawl to engage it with the gear 73, or into the dotted line position shown in that figure, in which position the spring will act to disengage the pawl from said gear. The lever 130 is operated to control the pawl 125 by a rod 135 one end of which is pivotally connected to the lever and the other end of which is pivotally connected to a bell crank lever 136, the latter being pivoted at 137 on the adjacent upright member 9 and being pivotally connected at 138 to a rod 139, this rod extending rearwardly through the cross member 5 at the rear end of the truck and being provided with a knob or handle 140 by means of which it may be pulled rearwardly or pushed forwardly to set the respective pawl 125 in engaging relation with the respective gear 73 to hold the respective drum 30 against unwinding movement under the load and for disengaging the respective pawl from its gear 73 and thereby permitting retrograde rotation of the respective drum 30 to unwind the lifting cable therefrom, it being understood that one of these pawls and the controlling connections therefor as described is provided for each of the winding drums.

In order to prevent uncontrolled unwinding movement of either of the drums 30 when the lifting cable is slack, a slack controlling brake is provided, this brake, as shown particularly in Fig. 5, comprising a friction band 150 which partially encircles each of the gears 73, one end of the band being adjustably connected to the adjacent upright member 9 of the frame, as by the threaded screw 151 and cooperating nuts 152, and the other end of this band is connected to a pin 153 which is fixed to a shaft 154 eccentrically of the axis of such shaft, this shaft being rotatably mounted in a suitable bearing 155 secured to the adjacent upright member 9 and having an arm 156 fixed thereto. One end of this arm is provided with a loop or eye 157 through which the respective lifting cable 21 passes, and the other end of the arm 156 has a tension spring 158 attached thereto. By this arrangement, while the lifting cable 21 is taut, as when under a load, the arm 156 will be swung into and held in the dotted line position shown in Fig. 5 in which position the brake band 150 will be released, and when the lifting cable is slack, the spring 158 will swing the arm 156 into the full line position shown in Fig. 5, thereby moving the pin 153 into a position to tighten the friction band 150 on the gear 73 and thereby prevent uncontrolled unwinding of the respective winding drum 30. It is to be understood that such a slack controlling brake is employed for each winding drum.

In order to enable the attendant to control the power applied during the lifting operation, a controlling member 160 is provided at the rear side of the rear cross member 5 of the truck. This controlling member extends forwardly and is provided with a lever 161 to which a rod 162 is connected, this rod being arranged to act upon the lever 163 of the carbureter or throttle of the engine in the truck which propels it and supplies power through the take-off device for the hoisting mechanism. By pulling of the handle 160, the throttle of the engine is adjusted to supply the power as desired or required for the lifting operation.

The operation of the derrick or hoisting mechanism hereinbefore described is controllable by a single attendant stationed at the rear end of the truck, which is particularly advantageous in the operation of such mechanism when used for extricating automobiles from positions, usually off the road and in which they are left after accidents and for lifting automobiles for towing or other purposes, since the lifting operation can be carried out under the easy and convenient control of the attendant while he occupies a position where he can constantly observe conditions as the lifting or hoisting operation proceeds.

In order to perform the lifting operation, assuming that both lifting cables are to be used, these cables are provided with the necessary amount of slack to enable the hooks 23 to be engaged with the automobile to be lifted by pulling rearwardly both of the knobs 140, whereby the ratchet pawls 125 are disengaged from the respective gears 73, thus permitting unwinding of the lifting cables from the respective drums 30. During the unwinding of the lifting cables, the pull thereon will operate the respective arms 156 to release the friction brakes on the respective gears 73 automatically, and when sufficient slack is in the cables, the arms 156 will swing under the action of the respective springs 158 to apply a braking effect to prevent further unwinding movement of the respective drums 30. Normally, the main clutch comprising the clutch members 89 and 92 is disengaged so that the cables can be unwound from the respective drums without interference from the power operating means. After attachment of the lifting cables to the disabled automobile or other load to be lifted, the knobs 140 are pushed forwardly, thereby setting the pawls 125 in their operative positions to cooperate with the respective gears 73 and thus prevent retrograde or unwinding rotation of the drums 30. The handles 82 are set to cause engagement of both of the sliding clutch members 74 with their respective pinions 72, thereby coupling both of the drums 30 to the power operating means.

The mechanism is then ready to lift the automobile or other load, and this operation is performed by power transmitted from the power take-off driven by the truck engine under control of the clevis 120 and the handle 160, pulling rearwardly of the clevis causing engagement of the clutch members 89 and 92 of the main clutch for the transmission of power from the power take-off to the winding drums 30, and pulling of the handle 160 causing the throttle of the truck engine to be opened more or less, as desired by the attendant to supply the amount of power necessary to lift the load at the desired speed. The clevis 120 and handle 160 are sufficiently close to one another at the rear end of the truck to enable a single attendant to operate them simultaneously by pulling the clevis 120 with one hand and manipulating the throttle controlling handle with the other hand. During the lifting of the load, the pawls 125 ride idly over the teeth of the gears 73 but they will prevent retrograde rotation of the drums 30. When the automobile or load has been lifted to the desired height, the clevis 120 is released, thus permitting it to return to its normal forward position and disengage the members 89 and 92 of the main clutch, thus interrupting the lifting operation, and the pawls 125 will act automatically to prevent retrograde rotation of the hoisting drums and thereby hold the automobile or load in raised position.

When it is desired to lower the automobile or load, it is only necessary for the attendant to pull the knobs 140 rearwardly and to pull the clevis 120 rearwardly to engage the main clutch members 89 and 92 to lift the automobile or load sufficiently to relieve the pressure of the engaged teeth of the gears 73 upon the pawls 125 whereupon the springs 131 will act to disengage these pawls from these gears, and to allow the winding drums to rotate in a retrograde direction under control of the partial engagement of the members 89 and 92 of the main clutch as governed by a reduced amount of pull on the clevis 120.

When using either one of the lifting cables to perform the lifting operation, the operation is the same as just described with the exception that only the handle 82 controlling the coupling between the respective drum 30 and the power means requires to be operated to couple that drum to the power means, since the coupling for the idle drum may be disengaged.

Since the coupling controlling members 82, ratchet pawl controlling members 140, main clutch controlling member 120 and engine throttle controlling member 160 are all located sufficiently close to one another to enable them to be reached and operated by the attendant while stationed at the rear end of the truck, it will be evident that the operation of the derrick or hoisting mechanism may be controlled with the greatest facility, and when either boom is swung to a lateral position for lifting at a side of the truck, the attendant at the controls will be able to observe and control the lifting or hoisting operation from a position where he will be safe from injury due to breakage of a cable or collapsing of a boom, as might occur in the event of an overload.

All of the control connections extending to the rear of the truck, such as the rods 81, 139 and 160 and the cable 118 are accommodated and enclosed in the space provided between the longitudinal sills 1a and between the chassis 1 and the truck floor 1b, so that these connections are not only concealed from view but their operation will not be interfered with by tools or other apparatus or articles that may be carried on the truck floor or in the truck body and they will be clear of the cross members of the chassis which usually connect the side members thereof.

By mounting the booms so that they swing on the sleeves 18 and 40 as vertical axes and extending the boom cables 35 axially through these sleeves, the booms will remain in any position into which they may be swung about their vertical axes, thereby avoiding accidental swinging of the booms out of position, as against the cab of the truck.

I claim as my invention:

1. In a wrecking truck having an engine and a throttle therefor remote from the rear of the truck, a pair of drums mounted on the truck, hoisting cables connected respectively to said drums, power means driven from the truck engine and common to said drums for operating them, and clutch means remote from the rear of the truck for connecting and disconnecting one or the other of the drums with respect to the power means, members operable from the rear of the truck and located in sufficiently close relation to be within the reach of an attendant stationed at the rear of the truck for controlling said clutch means and the throttle of the truck engine respectively.

2. In a wrecking truck having an engine and a throttle therefor remote from the rear of the truck, a pair of drums mounted on the truck, hoisting cables connected respectively to said drums, power means driven from the truck engine and common to said drums for operating them, and individual clutches remote from the rear of the truck for connecting each drum to the power means for winding the respective cables and for disconnecting each drum from the power means, control members individual to the respective clutches and located within reach of a single attendant stationed at the rear of the truck for controlling said clutches, and means also located at the rear of the truck for controlling the throttle of the truck engine.

3. In a wrecking truck having a pair of drums mounted thereon, hoisting cables connected respectively to said drums and having means for guiding them for lifting at the rear or one or the other side of the truck, power means common to said drums for operating them, and clutches individual to said drums and remote from the rear of the truck and a main clutch common to both drums and remote from the rear of the truck for connecting either or both of the drums to the power means for winding the respective cables, control members located adjacenetly and within reach of a single attendant and operable from the rear of the truck, said control members being connected respectively to said individual and main clutches for operating them.

4. In a wrecking truck having a pair of hoisting drums mounted thereon, hoisting cables connected respectively to said drums, power means common to said drums for operating them, clutch means remote from the rear of the truck for connecting one or the other of the drums to said power means to wind the respective cables and for disconnecting each of the drums from the power means, means remote from the rear of the truck for holding each of the drums while disconnected from the power means, said holding means being releasable individually to permit unwinding of the cables from the respective drums, and control members located at the rear of the truck within reach of a single attendant stationed at the rear of the truck and connected to said clutch means and releasable holding means for operating them to control the winding and unwinding of the cables.

5. In a wrecking truck having an engine and a throttle therefor remote from the rear of the truck, a hoisting drum mounted on the truck, a hoisting cable connected to said drum, power means connected to the engine of the truck for operating said drum, and clutch means remote from the rear of the truck for connecting the power means to and disconnecting it from the hoisting drum, means located at the rear of the truck and connected to the clutch means for controlling the operation of the hoisting drum by the power means, and means also located at the rear of the truck adjacent to said clutch controlling means and connected to the throttle of the truck engine for controlling the power applied by the latter to the power means.

6. In a wrecking truck having a hoisting drum mounted thereon, a hoisting cable connected to said drum, power means for operating the drum, a clutch for connecting the drum to the power means to wind the cable on the drum for lifting and for disconnecting it from the power means, and pawl means for holding the drum while disconnected from the power means, said pawl means being releasable to permit unwinding of the cable from the drum for lowering, a pair of control members located adjacently to one another at the rear of the truck and connected to said clutch and pawl means respectively for controlling the lifting and lowering operations.

7. In a wrecking truck having a pair of hoisting drums mounted thereon, hoisting cables connected respectively to said drums, power means common to said pair of drums for operating them, individual clutches for connecting each drum to and disconnecting it from said power means, a main clutch for transmitting power to the power means from the truck engine, and releasable means for holding each drum while unclutched from the power means, control members located adjacent to one another at the rear of the truck and connected respectively to one of said individual clutches, the holding means for the respective drum and the main clutch for controlling their operation, and control members located adjacent to one another at the rear of the truck and connected respectively to the other individual clutch, the other holding means and to the throttle of the truck engine for controlling their operation.

8. A wrecking truck having a chassis, longitudinal sills thereon, and a floor on said sills and above said sills and chassis, a longitudinal space being provided between the sills and the floor and chassis, a derrick mounted on said chassis and comprising hoisting drums and power means for operating them, said drums and power means being remote from the rear end of the truck, and control means for said drums and power means enclosed in said longitudinal space between the sills and below the floor and above the chassis and extending longitudinally to the rear of the truck.

9. In a wrecking truck having a drum mounted thereon, a hoisting cable connected to said drum, power means including a clutch for operating the drum, a cable connected to the clutch and extending to the rear of the truck for controlling the clutch, and a guide plate at the rear of the truck provided with a flared opening through which the cable extends for guiding the cable when pulled at an angle to its length.

10. In a wrecking truck, an upright frame mounted on the truck and having brackets secured to and projecting from a side thereof, a hoisting boom, a pair of sleeves secured in vertical alinement to said brackets and on which the boom is mounted to swing as a vertical axis to a side or to the rear of the truck, a boom supporting cable connected to the boom, a drum mounted in a relatively fixed position on the truck for operating said boom supporting cable, and means for guiding said cable to extend axially through said sleeves in all positions of said boom about its vertical axis.

ERNEST W. HOLMES.